US012772140B2

(12) United States Patent
Matsui et al.

(10) Patent No.: US 12,772,140 B2
(45) Date of Patent: Oct. 20, 2026

(54) COMMUNICATION SYSTEM AND COMMUNICATION METHOD

(71) Applicant: NTT, Inc., Tokyo (JP)

(72) Inventors: Munehiro Matsui, Musashino (JP); Fumihiro Yamashita, Musashino (JP); Junichi Abe, Musashino (JP); Hisayoshi Kano, Musashino (JP)

(73) Assignee: NTT, Inc., Tokyo (JP)

( * ) Notice: Subject to any disclaimer, the term of this patent is extended or adjusted under 35 U.S.C. 154(b) by 228 days.

(21) Appl. No.: 18/841,445

(22) PCT Filed: Feb. 28, 2022

(86) PCT No.: PCT/JP2022/008385

§ 371 (c)(1),
(2) Date: Aug. 26, 2024

(87) PCT Pub. No.: WO2023/162256

PCT Pub. Date: Aug. 31, 2023

(65) Prior Publication Data

US 2025/0168740 A1 May 22, 2025

(51) Int. Cl.
*H04W 40/12* (2009.01)
*H04L 43/0882* (2022.01)
*H04W 84/06* (2009.01)

(52) U.S. Cl.
CPC ......... *H04W 40/12* (2013.01); *H04L 43/0882* (2013.01); *H04W 84/06* (2013.01)

(58) Field of Classification Search
None
See application file for complete search history.

(56) References Cited

U.S. PATENT DOCUMENTS

2006/0064235 A1* 3/2006 Ishikawa ............ G01C 21/3694 701/117
2009/0082952 A1* 3/2009 Narita ................ G01C 21/3469 701/533

(Continued)

FOREIGN PATENT DOCUMENTS

CN 111884931 A 11/2020
JP 2012054763 A 3/2012

(Continued)

OTHER PUBLICATIONS

Tada et al., "A Study on an Efficient Route Control Method for Two-Layered Satellite Networks", The Institute of Electronics Information and Communication Engineers, Technical Report of IEICE, SAT2910-9, Jun. 2010, pp. 45-50 (12 pages including English Translation).

*Primary Examiner* — Diane L Lo
(74) *Attorney, Agent, or Firm* — XSENSUS LLP

(57) ABSTRACT

Provided is a communication system that adaptively performs optimal routing in a network formed by linking communication stations to each other. A routing control device monitors a traffic amount of links between communication stations including a satellite and a flight vehicle, calculates a cost used for routing in the communication stations including the satellite and the flight vehicle, and performs routing based on the cost. The calculation of the cost includes at least two of a process of calculating the congestion level of each of the links, a process of calculating a delay time of each of the links, and a process of calculating reliability of each of the links. The cost is calculated by combining results obtained by applying a weight to each of at least two elements obtained in the foregoing process.

20 Claims, 10 Drawing Sheets

(56) References Cited

U.S. PATENT DOCUMENTS

| | | | | |
|---|---|---|---|---|
| 2017/0222912 | A1* | 8/2017 | Atkinson | H04L 45/12 |
| 2018/0220196 | A1* | 8/2018 | Slater | H04N 21/64769 |
| 2023/0224218 | A1 | 7/2023 | Takano et al. | |

FOREIGN PATENT DOCUMENTS

| | | | |
|---|---|---|---|
| JP | 2016-111488 | A | 6/2016 |
| JP | 2016136651 | A | 7/2016 |
| JP | 2018-046470 | A | 3/2018 |
| WO | 2021/261074 | A1 | 12/2021 |

* cited by examiner

COMMUNICATION SYSTEM AND COMMUNICATION METHOD

CROSS-REFERENCE TO RELATED APPLICATION

The present application is based on PCT filing PCT/JP2022/008385, filed Feb. 28, 2022, the entire contents of which is incorporated herein by reference.

TECHNICAL FIELD

The present disclosure relates to a communication system and a communication method, and more particularly, to a communication system and a communication method appropriate for application to a network in which communication stations are linked to each other.

BACKGROUND ART

In recent years, mobile communication systems have developed, and mobile services can be enjoyed on most of the ground. There is super coverage as one requirement in 5-th generation or 6-th generation mobile communication systems expected to be commercialized in the future. Super coverage involves expanding a service area to places where a laying cost of an existing base station is expensive or places where it is difficult to lay a base station, such as places in a mountain, on the sea, and in the air. In addition, national resilience against natural disasters and the like is also required, and emergence of communication systems resistant to ground disasters is desired.

In order to realize this, non-terrestrial networks (NTNs) using satellites, unmanned aerial vehicles (UAVs), high altitude platform stations (HAPSs), drones, or the like are in the limelight. FIG. 1 illustrates an example of an NTN including a HAPS network. A flight vehicle 10 has a function of forming a mobile service area 12 by emitting a beam toward the ground. A terminal 14 located in the mobile service area 12 on the ground is connected to the flight vehicle 10 of the HAPS and is connected to a mobile network 16 via the flight vehicle 10. The flight vehicle 10 has a signal relay function, and packets transmitted from the terminal 14 are transmitted to an Internet network 20 via the flight vehicle 10, a ground base station 18, and the mobile network 16. Packets addressed from the Internet network 20 to the terminal 14 are similarly relayed.

A multilayer satellite network including a plurality of satellites and a HAPS network is conceivable for the future. FIG. 2 illustrates an example of an NIN including a geostationary orbit (GEO) satellite 22, a low earth orbit (LEO) satellite 24, and a HAPS network. The satellites 22 and 24 and the flight vehicle 10 belonging to their own networks connect links to each other to form a network. The satellites 22 and 24 and the flight vehicle 10 have a routing function, and traffic transmitted from the terminal 14 is routed and sent to the Internet network 20.

In the above-described future multilayer satellite network, traffic generated between the terminal 14 and the Internet network 20 is routed using each of the satellites 22 and 24 in the GEO satellite network or the LEO satellite network or the flight vehicle 10 in the HAPS network as a node. There are a plurality of routing protocols including a protocol that selects a route having a minimum metric with the number of hops as a metric like the routing information protocol (RIP) and the open shortest path first (OSPF) protocol that selects a route having a minimum cost with a bandwidth of an inter-node link as a path cost.

However, characteristics of each network are different. The characteristics are shown in Table 1.

TABLE 1

| | | |
|---|---|---|
| Link speed between flight vehicles | 1 | Gbit/s |
| Link speed between GEO satellite-flight vehicle | 1 | Gbit/s |
| Altitude of flight vehicle | 20 | km |
| Distance between flight vehicles | 100 | km |
| Altitude of GEO satellite | 36000 | km |

For example, since altitudes at which the flight vehicle 10 and the satellites 22 and 24 are located are different from each other, propagation delays are greatly different. Since the GEO satellite 22 is at an altitude of about 36,000 km, it takes about 120 ms for a signal transmitted from the terminal 14 to arrive at the satellite 22. On the other hand, since the flight vehicle 10 of the HAPS network is located at an altitude of about 20 km, a time taken until the signal transmitted from the terminal 14 arrives at the flight vehicle 10 is about 0.07 ms, and the delay is low. Non Patent Literature 1 also proposes a protocol in which a delay of an inter-node link is used as a cost.

CITATION LIST

Non Patent Literature

Non Patent Literature 1: A Study on an Efficient Route Control Method for Two-layered Satellite Networks, Yuta Tada, Hiroki Nishiyama, Naoko Yoshimura, and Nei Kato, Institute of Electronics, Information and communication Engineers, Technical Report, SAT2910-9, p45-p50, June 2010.

SUMMARY OF INVENTION

Technical Problem

As described above, in the NTN, there is a large difference in an inter-node distance between the satellites 22 and 24 and the flight vehicle 10. In addition, communication devices mounted on the satellites 22 and 24 and the flight vehicle 10 may be different depending on mounting restrictions (such as loading weights and power consumption) of the satellites 22 and 24 and the flight vehicle 10. Thus, there is a possibility of bandwidths of inter-node links of the satellites 22 and 24 and the flight vehicle 10 being different. Therefore, in the NTN, it is necessary to select an optimal route in consideration of not only one factor but a plurality of factors.

Available bandwidths between nodes are not constant. A congestion level of a network also changes when an inflow traffic amount changes. Therefore, it is conceivable that a state of the network changes from moment to moment. It is assumed that importance of each factor to be considered in routing changes according to the state of the network. Furthermore, since it is considered that the importance of the factor also depends on an operation policy of a network operator, it is necessary to perform a routing process by performing adaptive cost control.

The present disclosure has been made in view of the foregoing circumstances and a first object of the present disclosure is to provide a communication system that adaptively performs optimal routing according to a state of a network.

A second object of the present disclosure is to provide a communication method of adaptively providing optimal routing according to a state of a network.

Solution to Problem

According to a first aspect, a communication system in which communication stations are linked to each other to form a network and transmit packets through links performs:

- a process of monitoring a traffic amount of the link between the communication stations;
- a cost calculation process of calculating a cost used for routing in the communication stations; and
- a process of executing routing based on the cost.

The cost calculation process includes

- at least two processes among a process of calculating a congestion level of each link based on a traffic amount of a link between the communication stations, a process of calculating a delay time of each link based on at least one of a distance of the link between the communication stations and a transmit processing delay, and a process of calculating reliability of the link,
- a process of applying a weight to each of elements obtained in the at least two processes, and
- a process of calculating the cost by combining results obtained by multiplying the elements by the weights.

According to a second aspect, a communication method in which communication stations are linked to each other to form a network and transmit packets through links includes:

- a step of monitoring a traffic amount of the link between the communication stations;
- a cost calculation step of calculating a cost used for routing in the communication stations; and
- a step of executing routing based on the cost.

The cost calculation step includes

- at least two steps among a step of calculating a congestion level of each link based on a traffic amount of a link between the communication stations, a step of calculating a delay time of each link based on at least one of a distance of the link between the communication stations and a transmit processing delay, and a step of calculating reliability of the link,
- a step of applying a weight to each of elements obtained in the at least two processes, and
- a step of calculating the cost by combining results obtained by multiplying the elements by the weights.

Advantageous Effects of Invention

According to the first and second aspects, it is possible to provide optimal routing adaptively according to a state of a network.

DESCRIPTION OF EMBODIMENTS

First Embodiment

[Configuration of First Embodiment]

Figure 1:
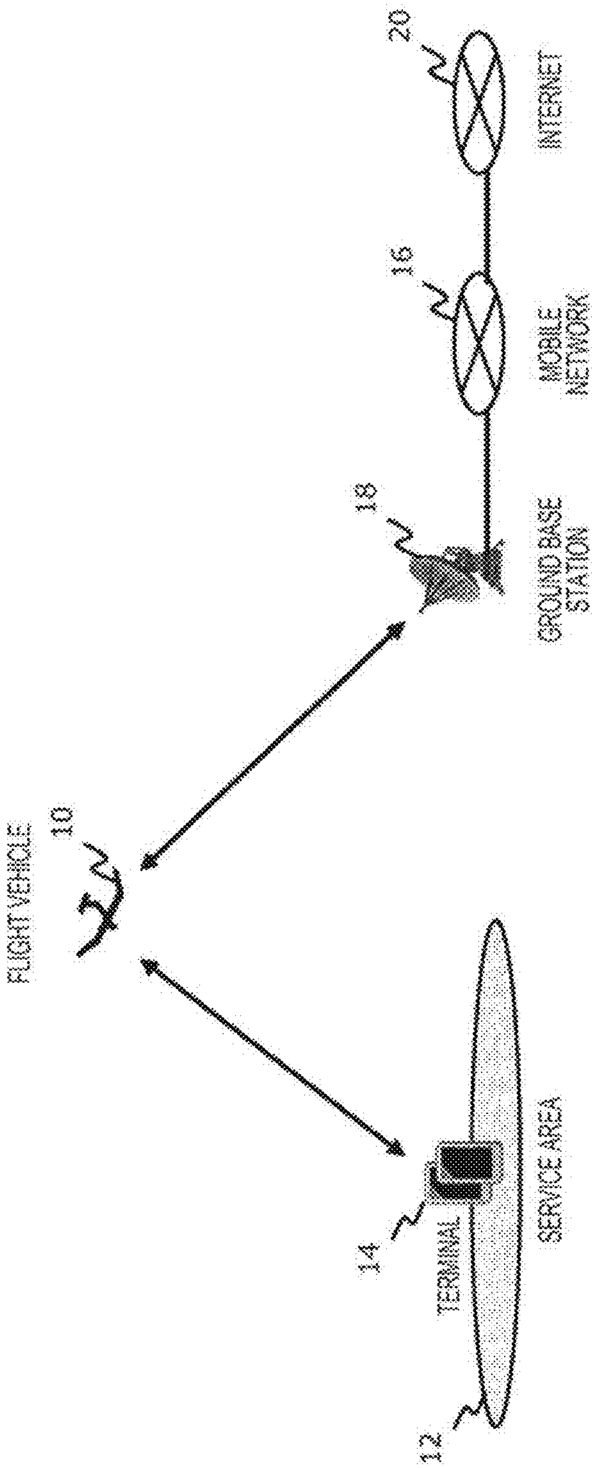
FIG. 1 is a diagram illustrating an example of an NTN of the related art including in a HAPS network.
Figure 2:
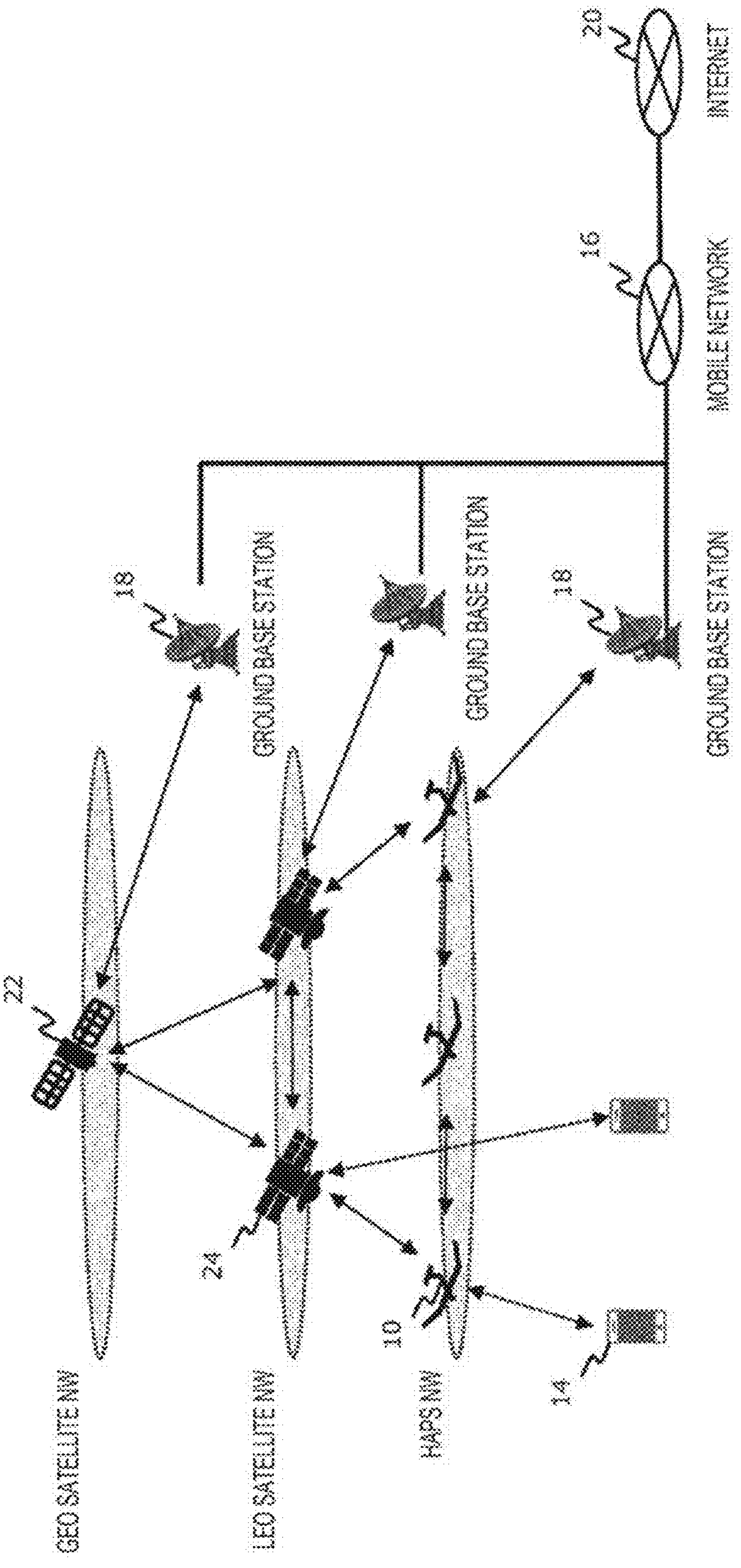
FIG. 2 is a diagram illustrating an example of an NTN of the related art including a GEO satellite, a low earth orbit satellite, and a HAPS network.
Figure 3:
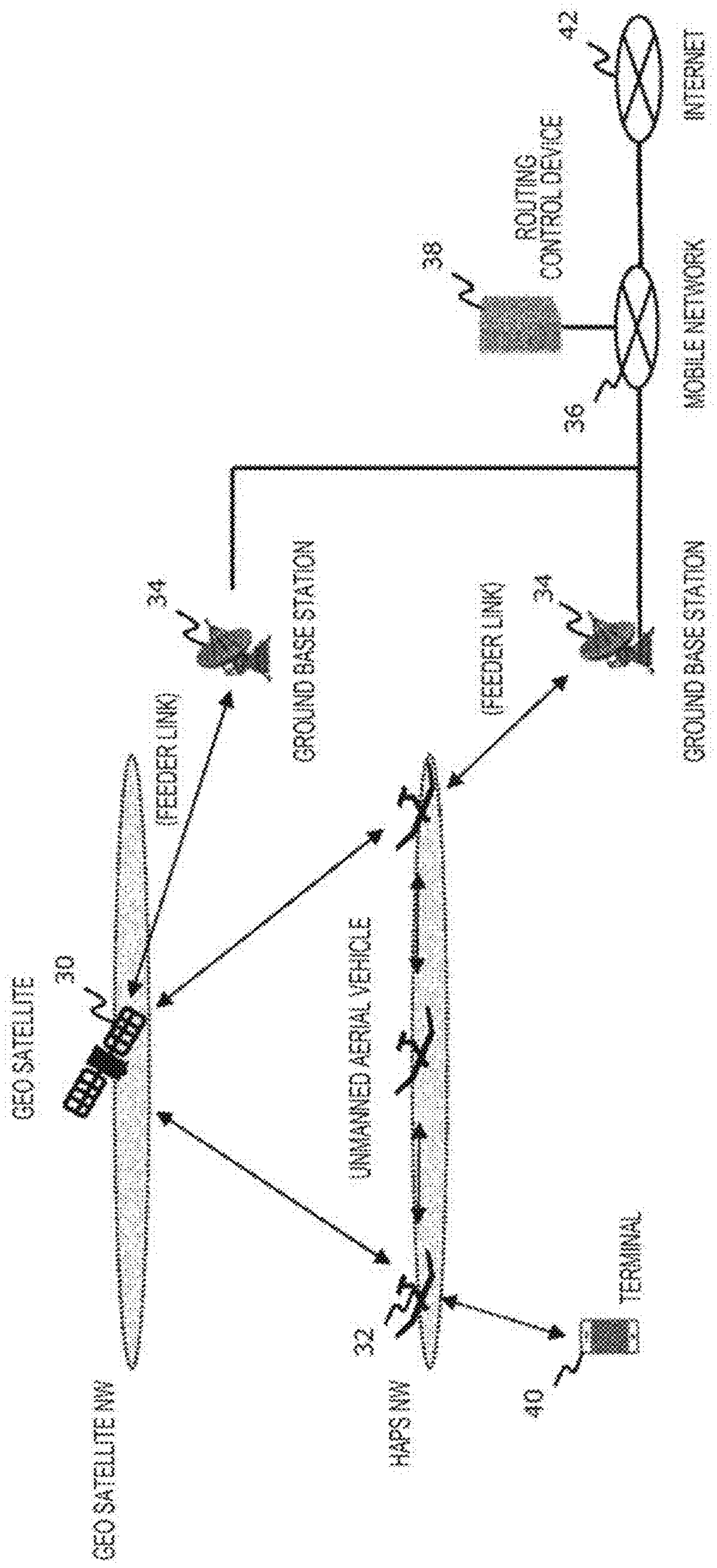
FIG. 3 is a diagram illustrating a communication system according to a first embodiment of the present disclosure.

FIG. 3 is a diagram illustrating an overall configuration of a communication system according to a first embodiment of the present disclosure. The communication system according to the present embodiment includes a GEO satellite 30, an unmanned aerial vehicle 32, a ground base station 34, a mobile network 36, and a routing control device 38.

The GEO satellite 30 and the unmanned aerial vehicle 32 function as communication stations that form a service area on the ground as a part of a GEO satellite network and a HAPS network, respectively. A link communication device and a routing function of relaying signals are mounted on the GEO satellite 30 and the unmanned aerial vehicle 32, respectively. The GEO satellite and the unmanned aerial vehicle are connected to each other to establish a network and relay signals transmitted and received between a connected terminal 40 located in the service area and the mobile network 36. The GEO satellite 30 and the unmanned aerial vehicle 32 further have a function of observing a traffic amount flowing through the link.

The ground base station 34 transmits and receives signals between the mobile network 36 on the ground and each of the satellite 30 and the unmanned aerial vehicle 32. The mobile network 36 manages the terminal 40, controls a transmission/reception session, and the like. Packets are transmitted between the terminal 40 and the Internet network 42.

The routing control device 38 calculates a cost of each link according to a connection status of the network, an operation policy of a network operator, and the like and notifies the satellite 30 and the flight vehicle 32 of the cost. The routing control device 38 also has a function of collecting information from the satellite 30 and the flight vehicle 32 to calculate cost, and collects information regarding a link speed and a flowing traffic amount. The routing control device 38 has a function of collecting connection information of a feeder link from the ground base station 34, that is, connection information of a wireless line between a ground base station and a space station (the GEO satellite 30 and the unmanned aerial vehicle 32). Further, the routing control device 38 has link connection information regarding the satellite 30 and the flight vehicle 32 to which the link is connected and positional information of the satellite 30 and the flight vehicle 32, and calculates a propagation delay of the link related to the satellite 30 and the flight vehicle 32.

[Flow of Process in First Embodiment]

Figure 4:
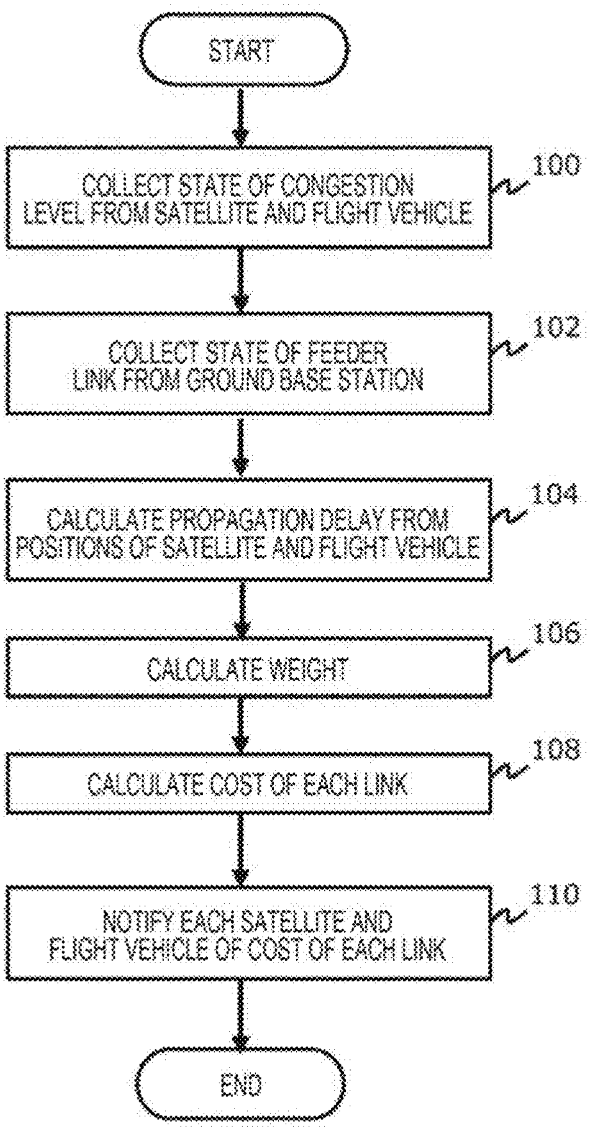
FIG. 4 is a flowchart illustrating a flow of a main process performed by a routing control device illustrated in FIG. 3.

FIG. 4 is a diagram illustrating a flowchart of a main process performed by the routing control device 38. Here, first, information regarding a link speed and an average traffic amount per unit time flowing through the link is collected from the satellite 30 and the flight vehicle 32 as information regarding a congestion level (step 100).

Subsequently, connection availability information of the feeder link is collected from each of the ground base stations 34 (step 102).

Thereafter, link connection information of the satellite 30 and the flight vehicle 32 is acquired, and a propagation delay of each link is calculated from the positions (step 104). Specifically, a propagation delay time is calculated by dividing a distance for each of the satellite 30 and the flight vehicle 32 by the speed of light.

Thereafter, a weight is calculated from the connection availability information of the feeder link (step 106). Further, a cost of each link is calculated based on a link speed and a traffic amount collected from the satellite 30 and the flight vehicle 32, the propagation delay calculated based on the position of each of the satellite 30 and the flight vehicle 32, and the weight calculated in step 106 (step 108). Calculation Formula (1) of the cost S of each link is shown below.

[Math. 1]

$$S = w \cdot Br/(R - T) + (1 - w) \cdot D/Bd \tag{1}$$

Here, w is a weight, Br is a reference value [bit/s] of a link speed, R is a link speed [bit/s], T is an average traffic amount [bit/s] per unit time flowing in the link, D is a propagation delay time [s] of the link, and Bd is a reference value [s] of the delay time. The first term on the right side is reserve power of an available bandwidth, in other words, the cost related to the congestion level, and the second term on the right side is the cost related to the delay time.

After the cost of each link is calculated, each of the satellite 30 and the flight vehicle 32 is notified of the cost of each link (step 110). The satellite 30 and the flight vehicle 32 perform a routing process for traffic based on the notified cost.

[Operation Example of First Embodiment]

Figure 5:
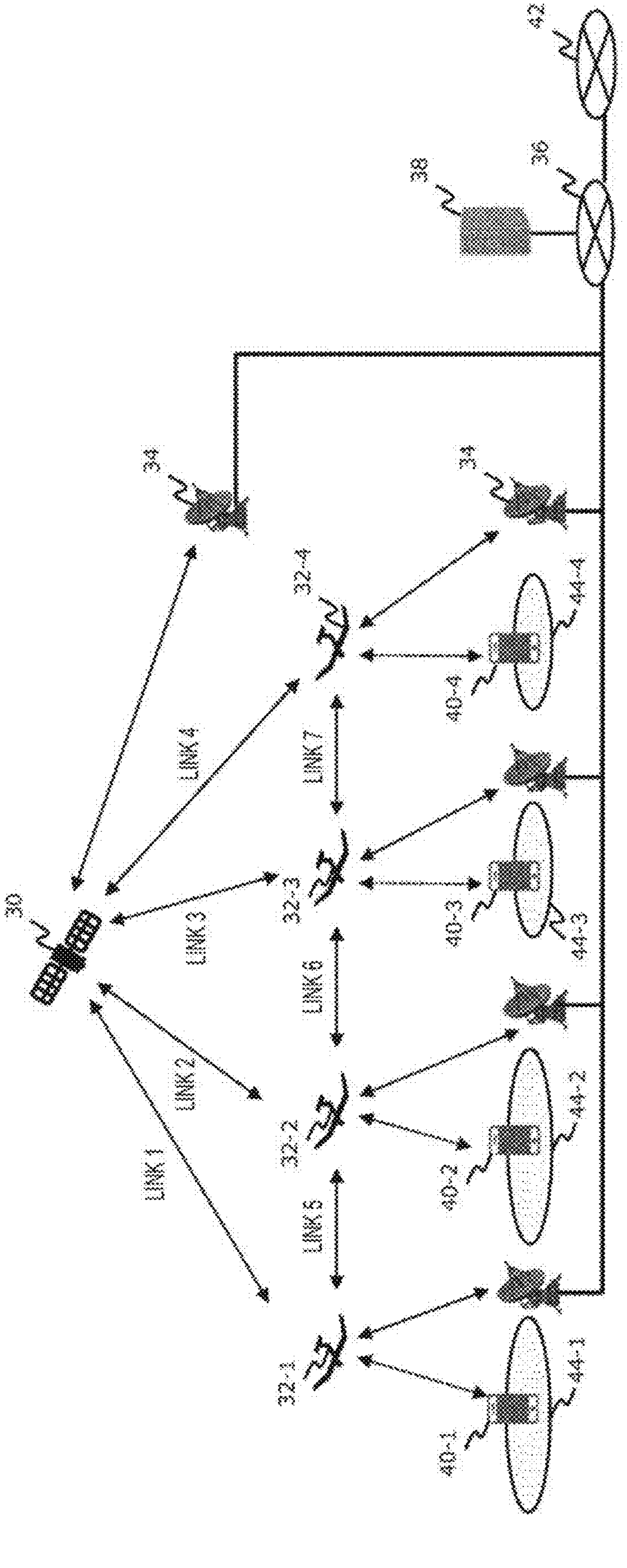
FIG. 5 is a diagram illustrating an operation example of the communication system according to the first embodiment of the present disclosure.

Next, an operation example of the first embodiment will be described. Here, a network as illustrated in FIG. 5 is assumed. The GEO satellite network includes a single GEO satellite 30. The HAPS network is assumed to be a network including four flight vehicles 32-1 to 32-4. Hereinafter, when it is necessary to distinguish the four flight vehicles from each other, subscripts such as "32-1" are added. When it is not necessary to distinguish the four flight vehicles from each other, the subscripts are omitted and the four flight vehicles are simply referred to as "32". The same applies to other elements.

In the operation example illustrated in FIG. 5, it is assumed that a speed (bandwidth) of each link, altitudes of the GEO satellite 30 and the flight vehicle 32 and a distance between the flight vehicles are the same as those illustrated in the foregoing Table 1. It is assumed that a difference in a distance between the GEO satellite 30 and each of the flight vehicles 32 due to a position of the flight vehicle 32 is ignored, and a distance between the GEO satellite 30 and each of the flight vehicles 32 is uniform.

The single ground base station 34 is disposed for each flight vehicle 32 and the satellite 30, and they are connected to the mobile network 36 via a feeder link. Each flight vehicle 32 forms a cover area 44 on the ground surface by a beam. The terminal 40 in the cover area 44 is connected to the flight vehicle 32 and communicates with the Internet network 42 via the GEO satellite network, the HAPS network, and the mobile network 36.

The routing control device 38 has information regarding the altitudes of the GEO satellite 30 and the flight vehicle 32 and the distance between the flight vehicles. The routing control device 38 periodically collects information regarding a link speed and an average traffic amount of each link and information regarding a connection state of the feeder link from the GEO satellite 30 and the flight vehicle 32. Since the feeder link in the HAPS network uses a high frequency bandwidth, the feeder link is easily affected by rain attenuation. The link is easily disconnected when heavy rain occurs around the ground base station 34.

Traffic generated by a terminal 40-1 located in a cover area 44-1 of the first flight vehicle 32-1 passes through the feeder link of the first flight vehicle 32-1 and is transmitted to the Internet network 42 via the mobile network 36.

Figure 6:
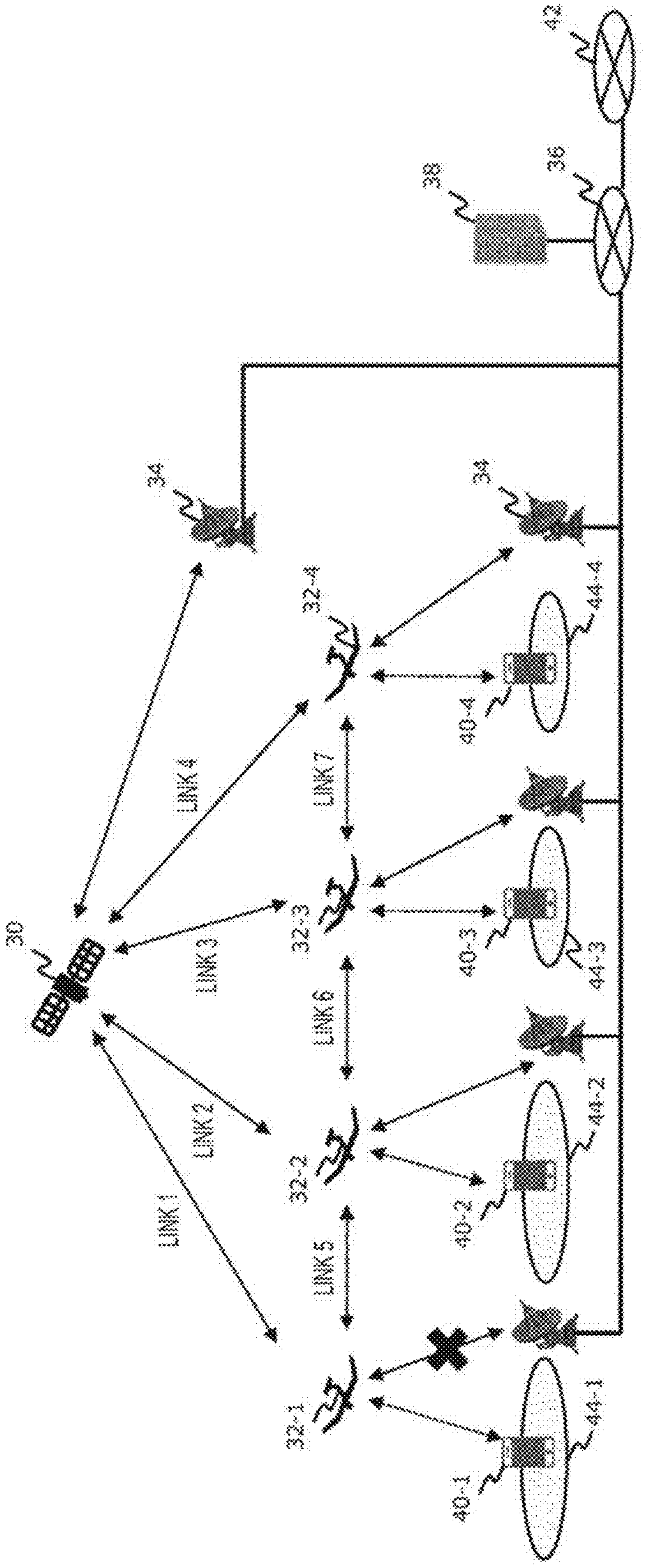
FIG. 6 is a diagram illustrating a state in which a feeder link of a first flight vehicle 32-1 is disconnected due to heavy rain in the situation illustrated in FIG. 5.

FIG. 6 is a diagram illustrating a state in which the feeder link of the first flight vehicle 32-1 is disconnected due to heavy rain. In this case, the routing control device 38 first calculates a propagation delay of each link from information regarding the altitudes of the GEO satellite 30 and the flight vehicle 32, as week as the distance between the flight vehicles. Table 2 shows an example of the calculated propagation delay and the link speed and the traffic amount of each link collected from the GEO satellite 30 and the flight vehicle 32.

TABLE 2

| Link | Link speed | Average traffic amount per unit time | Propagation delay |
|---|---|---|---|
| Link 1 | 1 Gbit/s | 0 bit/s | 120 ms |
| Link 2 | 1 Gbit/s | 0 bit/s | 120 ms |
| Link 3 | 1 Gbit/s | 0 bit/s | 120 ms |
| Link 4 | 1 Gbit/s | 0 bit/s | 120 ms |
| Link 5 | 1 Gbit/s | 0 bit/s | 3.3 ms |
| Link 6 | 1 Gbit/s | 0 bit/s | 3.3 ms |
| Link 7 | 1 Gbit/s | 0 bit/s | 3.3 ms |

Next, the routing control device 38 calculates a cost of each link. A reference value of the link speed is set to 1 Gbits/s, and a reference value of the delay time is set to 100 ms. Usually, a value of the weight w is set to 0.5. Table 3 shows a calculated link capacity usage rate and cost. The calculated cost is transmitted to the GEO satellite 30 and the flight vehicle 32.

TABLE 3

| Link | Link capacity usage rate | Cost |
|---|---|---|
| Link 1 | 0 | 0.5*1/1 + 0.5*120/100 = 0.5 + 0.6 = 1.1 |
| Link 2 | 0 | 1.1 |
| Link 3 | 0 | 1.1 |
| Link 4 | 0 | 1.1 |
| Link 5 | 0 | 0.5*1 + 0.5*3.3/100 = 0.5 + 0.0165 = 0.5165 |
| Link 6 | 0 | 0.5165 |
| Link 7 | 0 | 0.5165 |

The first flight vehicle 32-1 selects a route of traffic generated in the cover area 44-1 based on the transmitted cost of each link. Specifically, costs of the link 1 and the link 5 that can be used by the first flight vehicle 32-1 are compared to each other, and a smaller value is selected. Here, since the cost of the link 5 is small, the traffic is transmitted to the link 5. The traffic transmitted via the link 5 is transmitted to the mobile network via the feeder link of the second flight vehicle 32-2.

Figure 7:
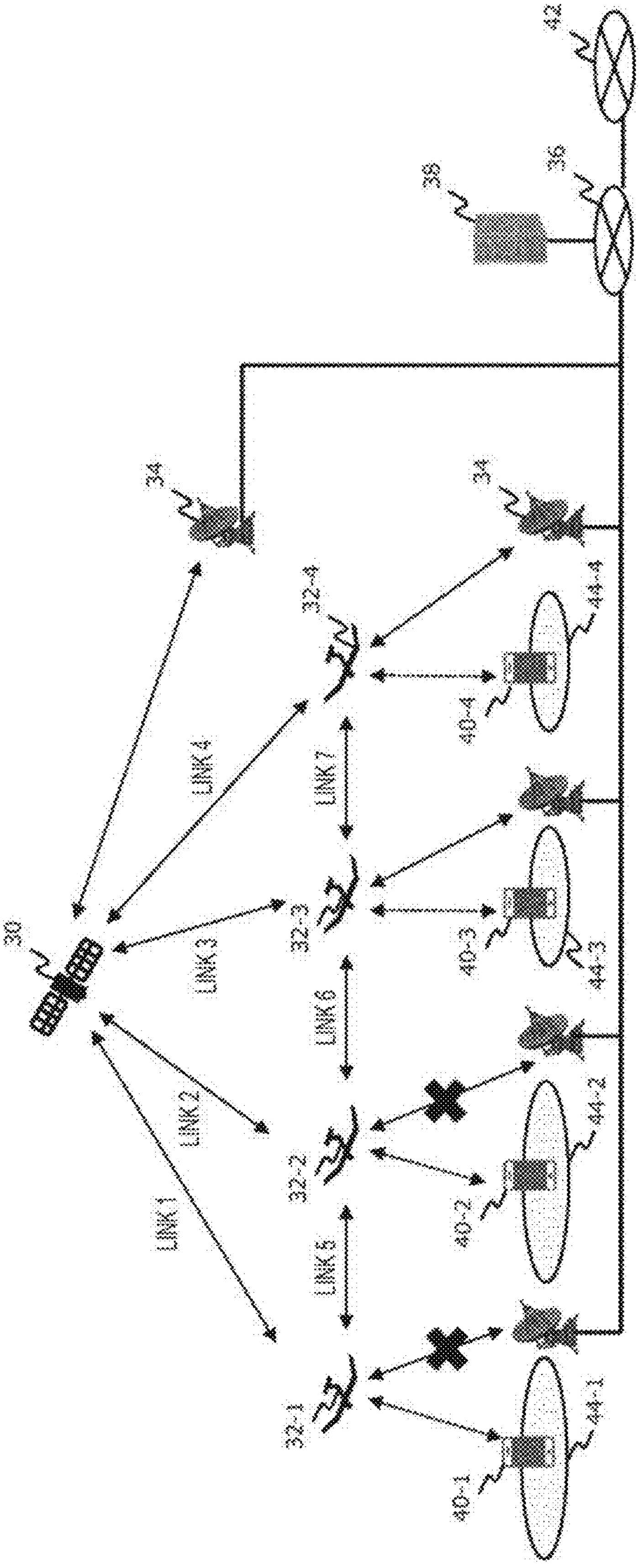
FIG. 7 is a diagram illustrating a state in which a feeder link of a second flight vehicle 32-2 is further disconnected due to heavy rain in the situation illustrated in FIG. 6.

FIG. 7 is a diagram illustrating a state in which the feeder link of the second flight vehicle 32-2 is disconnected due to heavy rain. Table 4 shows a propagation delay calculated under this state, and a link speed and a traffic amount of each link collected from the GEO satellite 30 and the flight vehicle 32.

TABLE 4

| Link | Link speed | Average traffic amount per unit time | Propagation delay |
|---|---|---|---|
| Link 1 | 1 Gbit/s | 0 bit/s | 120 ms |
| Link 2 | 1 Gbit/s | 0 bit/s | 120 ms |
| Link 3 | 1 Gbit/s | 0 bit/s | 120 ms |
| Link 4 | 1 Gbit/s | 0 bit/s | 120 ms |
| Link 5 | 1 Gbit/s | 200 Mbit/s | 3.3 ms |
| Link 6 | 1 Gbit/s | 0 bit/s | 3.3 ms |
| Link 7 | 1 Gbit/s | 0 bit/s | 3.3 ms |

Further, Table 5 shows a calculated link capacity usage rate and a cost.

TABLE 5

| Link | Link capacity usage rate | Cost |
|---|---|---|
| Link 1 | 0 | 1.1 |
| Link 2 | 0 | 1.1 |
| Link 3 | 0 | 1.1 |
| Link 4 | 0 | 1.1 |
| Link 5 | 0.2 | 0.5*1/(1 − 0.2) + 0.5*3.3/100 = 0.625 + 0.0165 = 0.6415 |
| Link 6 | 0 | 0.5165 |
| Link 7 | 0 | 0.5165 |

In the comparison between the links 1 and 5 that can be used by the first flight vehicle 32-1, the cost of the link 5 is lower. Therefore, the traffic of the first flight vehicle 32-1 is transmitted to the link 5. Subsequently, in comparison between links 2 and 6 that can be used by the second flight vehicle 32-2, the cost of the link 6 is lower. Therefore, traffic is transmitted to the link 6 for the second flight vehicle 32-2. The traffic transmitted via the link 6 is transmitted to the mobile network 36 via the feeder link of the third flight vehicle 32-3.

Figure 8:
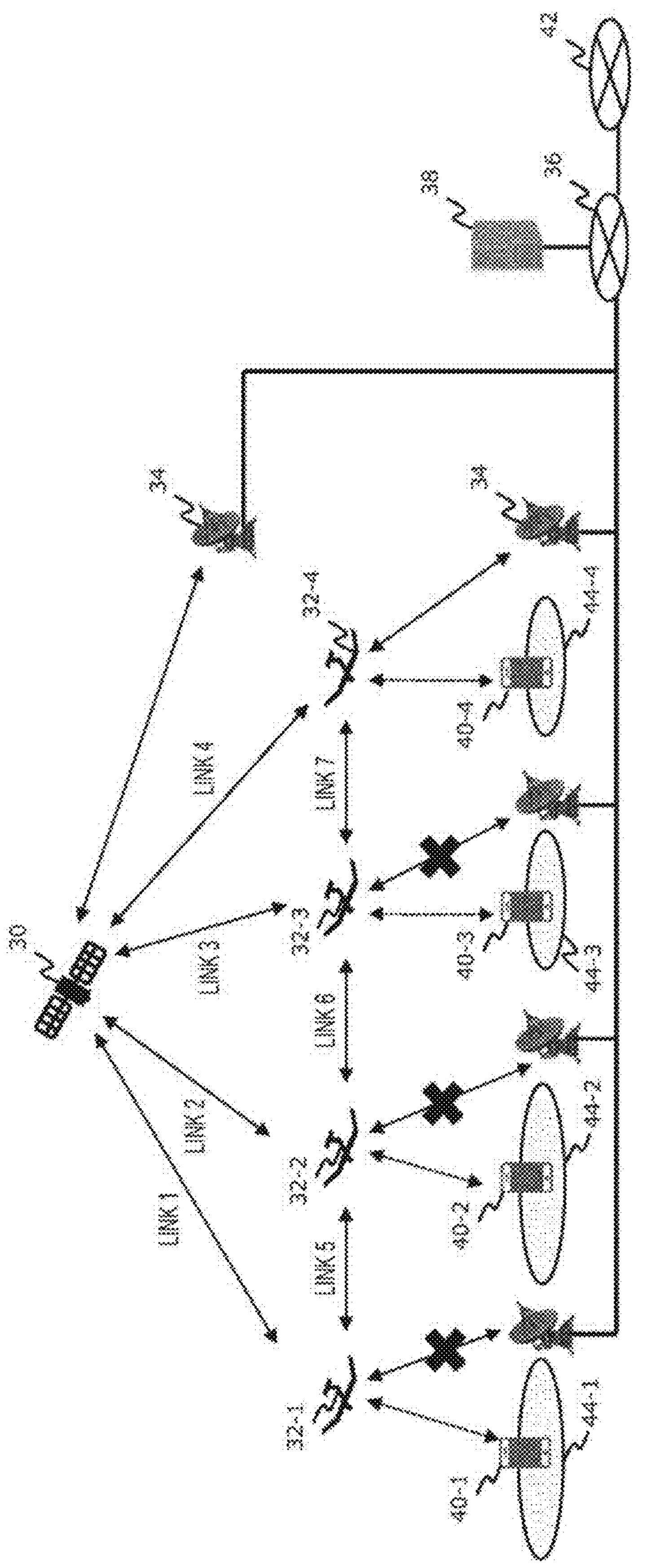
FIG. 8 is a diagram illustrating a state in which a feeder link of a third flight vehicle 32-3 is further disconnected due to heavy rain in the situation illustrated in FIG. 7.

Further, FIG. 8 is a diagram illustrating a state in which the feeder link of the third flight vehicle 32-3 is disconnected due to heavy rain. Since the number of disconnected feeder links has increased, the routing control device 38 changes the value of the weight w used to calculate the cost from a normal value of 0.5 to 0.8. Accordingly, the weight of the cost related to delay is reduced, thus weight of the cost related to the link speed is relatively increased. Table 6 shows a propagation delay calculated under this condition, and a link speed and a traffic amount of each link collected from the GEO satellite 30 and the flight vehicle 32.

TABLE 6

| Link | Link speed | Average traffic amount per unit time | Propagation delay |
|---|---|---|---|
| Link 1 | 1 Gbit/s | 0 bit/s | 120 ms |
| Link 2 | 1 Gbit/s | 0 bit/s | 120 ms |
| Link 3 | 1 Gbit/s | 0 bit/s | 120 ms |
| Link 4 | 1 Gbit/s | 0 bit/s | 120 ms |
| Link 5 | 1 Gbit/s | 200 Mbit/s | 3.3 ms |
| Link 6 | 1 Gbit/s | 500 Mbit/s | 3.3 ms |
| Link 7 | 1 Gbit/s | 0 bit/s | 3.3 ms |

Further, Table 7 shows a calculated link capacity usage rate and a cost.

TABLE 7

| Link | Link capacity usage rate | Cost |
|---|---|---|
| Link 1 | 0 | 0.8*1/1 + 0.2*120/100 = 0.8 + 0.24 = 1.04 |
| Link 2 | 0 | 1.04 |
| Link 3 | 0 | 1.04 |
| Link 4 | 0 | 1.04 |
| Link 5 | 0.2 | 0.8*1/(1 − 0.2) + 0.2*3.3/100 = 1 + 0.0066 |
| Link 6 | 0.5 | 0.8*1/(1 − 0.5) + 0.2*3.3/100 = 1.6 + 0.0066 |
| Link 7 | 0 | 0.8*1/1 + 0.2*3.3/100 = 0.8 + 0.0066 = 0.8066 |

When the links 1 and 5 that can be used by the first flight vehicle 32-1 are compared to each other, the cost of the link 5 is lower. Therefore, the traffic of the first flight vehicle 32-1 is transmitted to the link 5. Subsequently, when the links 2 and 6 are compared with each other for the second flight vehicle 32-2, the cost of the link 2 is lower. Therefore, traffic is transmitted to the link 2 for the second flight vehicle 32-2. Further, for the third flight vehicle 32-3, the traffic is transmitted to a link 7 with a lower cost based on the comparison between the links 3 and 7. In this routing, some traffic generated in the HAPS network is transmitted to the GEO satellite network.

In this way, in the communication system according to the present embodiment, when the number of disconnections of the feeder link of the HAPS network increases and the traffic of the HAPS network stagnates, the weight can be changed and the traffic to the GEO satellite network can flow. As a result, according to this system, even when the number of disconnections increases, the traffic can efficiently flow to the Internet network 42.

Variation of First Embodiment

The present embodiment is a mode in which the routing control device 38 calculates a cost of each link and notifies each satellite 30 and the flight vehicle 32 of the result, but the present disclosure is not limited thereto. The routing control device 38 may notify the satellite 30 and the flight vehicle 32 of necessary information such as a propagation delay of each link and a state of the feeder link, calculate a cost by the satellite 30 and the flight vehicle 32, notify each other in the network, and autonomously perform the routing.

In the present embodiment, the link speed and the link capacity usage rate are used as indices of the congestion level, but the present disclosure is not limited thereto. For example, a usage rate of a buffer that temporarily stores traffic received in the routing function may be used as an index of the congestion level.

In the present embodiment, only a propagation delay time based on a distance between satellites or flight vehicles is used as the delay time of the link, but the present disclosure is not limited thereto. The link delay time may include a transmission waiting time due to traffic stagnation in the routing function of the satellite 30 or the flight vehicle 32 and a time required for a transmission or reception process.

In the present embodiment, the GEO satellite and the HAPS network of which positions are not almost changed are assumed, but a similar process can be performed even in the LEO satellite as long as positional information can be ascertained. For example, when the routing control device 38 can acquire orbit information of the LEO satellite, the routing control device 38 can recognize a distance between the satellites and the flight vehicle, and can calculate a propagation delay.

In the present embodiment, information is collected from the satellite 30 and the flight vehicle 32, and routing between the satellite and the flight vehicle is controlled. The present disclosure is not limited thereto. Similarly, it is possible to perform the routing process including the feeder link by calculating the congestion level and the propagation delay of the feeder link.

A non-ground network including a satellite or a HAPS is assumed, but the present disclosure is not limited thereto, and can also be applied to a network including a node station on which a communication device is mounted regardless of wireless or wired connection.

Further, in the above-described first embodiment, the weight w is changed according to the number of disconnections of the feeder link of the HAPS network, but the present disclosure is not limited thereto. As long as the weight w is changed according to a connection status of the network, the weight w may be changed according to a disconnection ratio, for example.

Second Embodiment

As described above, in the first embodiment, control is performed such that the weight w is changed according to the number of disconnections of the feeder link of the HAPS network and the traffic flows to the GEO satellite network. This is because stagnation of traffic in the HAPS network is predicted. As a similar process, a traffic amount distributed in the HAPS network is directly monitored, and the weight w is adaptively controlled when a total stagnating traffic amount increases. Alternatively, a total packet stagnation amount in the communication device is monitored. The weight w is adaptively controlled when the amount increases. Accordingly, a process similar to that of the first embodiment can be performed.

Third Embodiment

In the above-described first embodiment, the weight w is changed according to the number of disconnections of the feeder link of the HAPS network, but the method of controlling the weight w is not limited thereto. In the present embodiment, the weight w is controlled based on an operation policy of a network operator.

When the amount of generated traffic increases due to occurrence of a disaster, the GEO satellite network is actively used to accommodate traffic as much as possible. In this case, the value of the weight w in Cost Calculation Formula (1) is increased to increase an influence of the congestion level and reduce an influence of the delay time. According to the above, it is possible to increase traffic transmitted to the GEO satellite network.

Conversely, when it is not preferable to increase a delay time by passing through the GEO satellite network, the value of the weight w in Cost Calculation Formula (1) is reduced to reduce the influence of the congestion level and increase the influence of the delay time. Accordingly, traffic transmitted to the GEO satellite network can be inhibited, and communication with less delay can be realized.

In the present embodiment, a function of controlling the weight w based on the operation policy can be realized by the network operator manually setting the weight w and causing the communication system to detect the setting. Alternatively, events that may occur in the network may be stored in advance in a memory for each situation where it is necessary to switch operation policies, such as a situation where a disaster occurs or a situation where delay avoidance is necessary. In this case, the communication system may be caused to detect such an event occurring in the network and automatically switch the weight w.

Fourth Embodiment

Although a traffic type is not distinguished in the above-described first embodiment, the traffic type may be distinguished. For example, a delay time is required to be small for traffic such as voice in which real-time property is required. Such traffic may be distinguished from other traffic, and routing control may be performed for each traffic. Information regarding an application type or information regarding quality of service (QoS) according to the application type is stored in a packet of traffic. The information is acquired in a routing function in a satellite or a flight vehicle to perform routing for each traffic type.

The routing control device 38 calculates a cost for each traffic type. Specifically, in Formula (1), the weight is controlled for each traffic type. Table 8 shows a variable range of the weight w for each traffic type.

TABLE 8

| Traffic type | Variable range of weight |
|---|---|
| Voice | 0 to 0.2 |
| SNS | 0.5 to 1 |
| Others | 0.2 to 0.8 |

In the case of traffic requiring a small delay time such as voice, traffic transmitted to the GEO satellite network is not preferable. Therefore, a variable range limited to a small weight value is set. On the other hand, when a relatively large delay time such as SNS is allowed, a variable range limited to a large weight value is set so that traffic is actively transmitted to the GEO satellite network.

Fifth Embodiment

In the above-described first embodiment, a cost is calculated using a scale of a congestion level and a delay of each link. In the present embodiment, the cost is calculated by combining the reliability of each link. For example, when a high frequency is used in the feeder link, an influence of weather on radio waves increases and power attenuation of the radio waves due to rainfall or the like increases. Therefore, when the weather is bad, a link is easily disconnected and reliability of the link is low. Accordingly, the reliability of the link is added to cost calculation.

[Math. 2]

$$S = w1 \cdot Br/(R-T) + w2 \cdot D/Bd + w3 \cdot C \quad (2)$$

Here, w1, w2, and w3 are set such that w1+w2+w3=1 is satisfied. Here, C is reliability of a link. In the case of a feeder link, the reliability is set to be high when the weather is good. The reliability is set to be low when the weather is bad. As an operation policy of the network operator, a value of w3 is set to be large so that a feeder link with low reliability is hardly used as much as possible. When the traffic in the network increases and becomes congested, the value of w3 is lowered, and the feeder link with low reliability is actively used to regulate the traffic in the network.

As described above, the communication system according to the present disclosure can calculate an adaptive cost in routing. Therefore, it is possible to perform adaptive routing according to a congestion level due to an increase in traffic, an operation policy change by a network operator, and the like.

Figure 9:
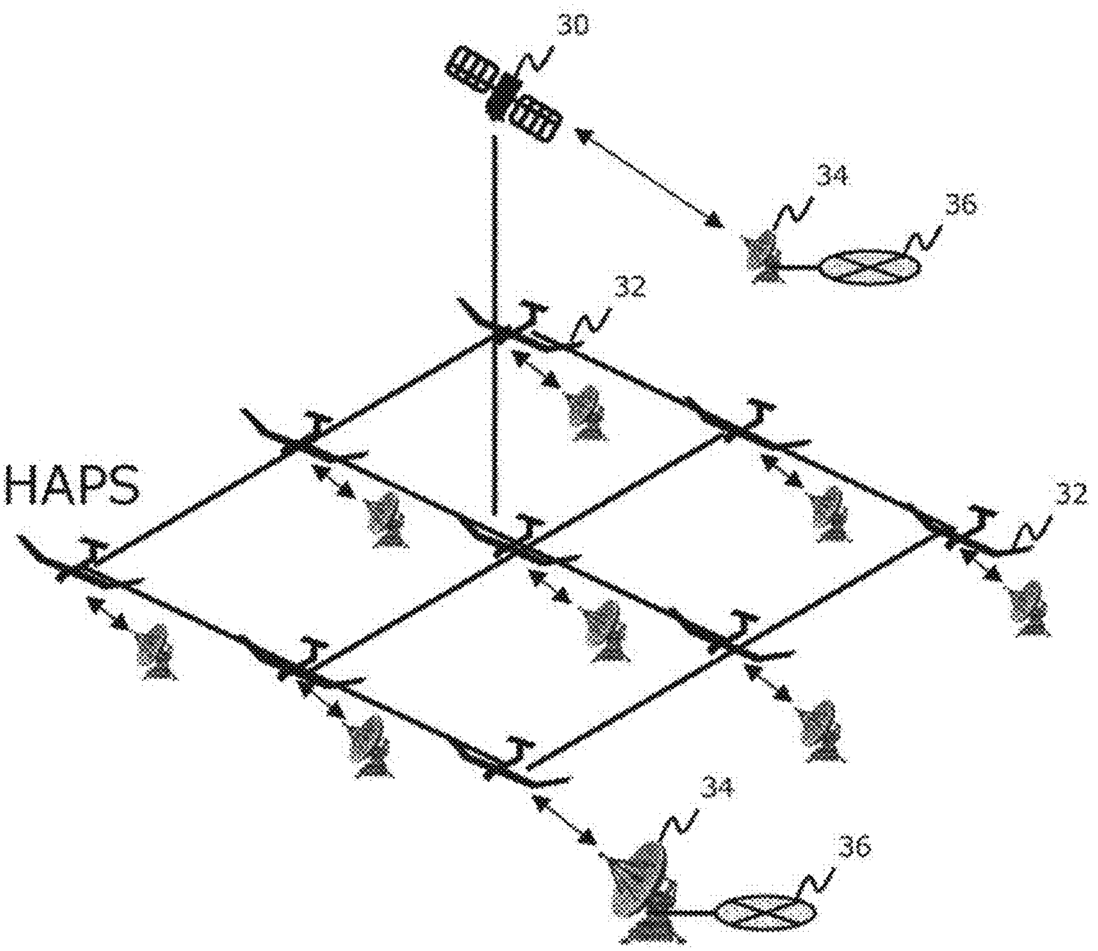
FIG. 9 is a diagram illustrating a network model assumed to perform evaluation by simulation.

Hereinafter, evaluation by simulation will be described. FIG. 9 is a diagram illustrating a network model. Table 9 shows evaluation specifications.

TABLE 9

| | |
|---|---|
| Inter-HAPS distance | 100 km |
| Altitude of HAPS | 20 km |
| Altitude of GEO satellite | 36000 km |
| Inter-HAPS link speed | 1 Gbit/s |
| Link speed between GEO-HAPS | 1 Gbit/s |
| HAPS feeder link speed | 2 Gbit/s |
| GEO feeder link speed | 2 Gbit/s |
| Link speed reference value | 1 Gbit/s |
| Delay time reference value | 100 ms |

As illustrated in FIG. 9, nine HAPSs were arranged in a lattice pattern, the vertical and horizontal directions were connected by a link, and a network topology in which one HAPS at its center and a GEO satellite were connected by a link was evaluated. A traffic amount of 0.1 to 1 Gbit/s was randomly generated in each HAPS, and routing to a ground base station was performed based on the cost calculation of Formula (1). Assuming a case where a rain area is randomly generated and the feeder link of the HAPS is randomly disconnected, a normalized throughput (the case where there is no rain area is set to 1) and an average E2E delay time in the entire HAPS were evaluated. The E2E delay time is only a link propagation time. As the rain area increases, the number of disconnections of the feeder link increases.

Figure 10:
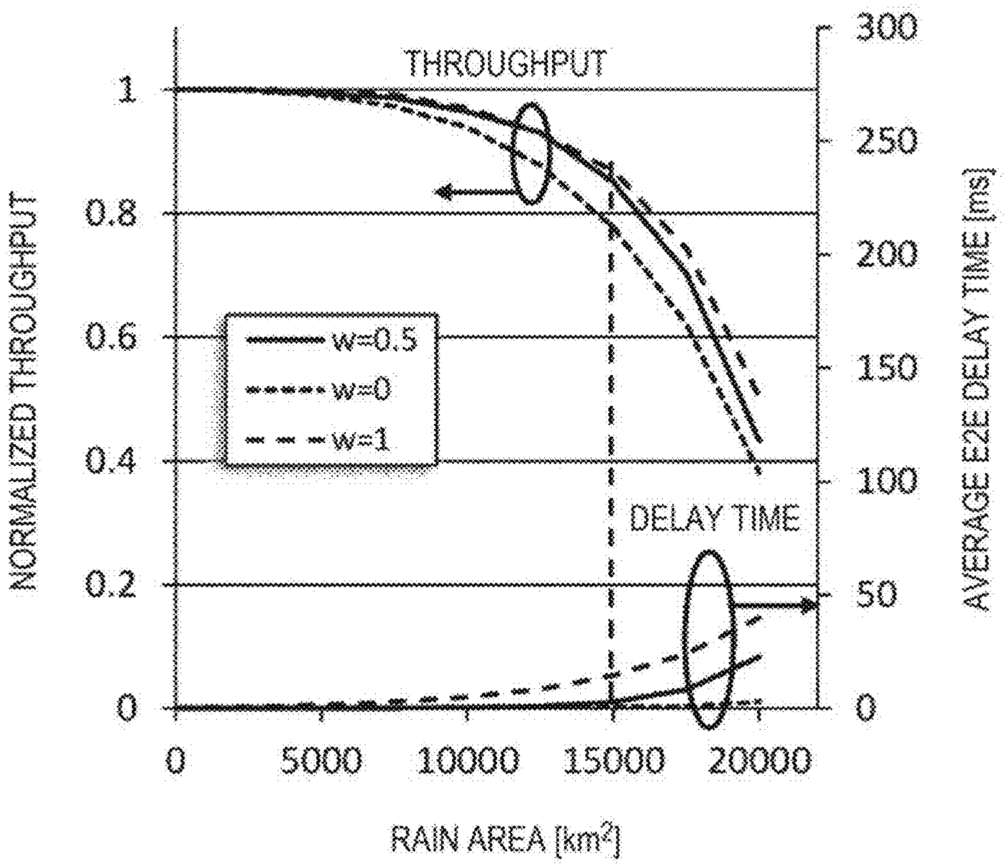
FIG. 10 is a diagram illustrating a difference in characteristics indicated in a normalized throughput and an average E2E delay time depending on a difference in a weight w.

FIG. 10 is a diagram illustrating characteristics when w=0.5, where two scales are equal weights, and w=1 as well as w=0. In the case of w=1, a link of the GEO satellite is easily selected because the delay time of each link is not considered. Because traffic is offloaded in a GEO satellite, a decrease in throughput is most mitigated, but the average E2E delay time is the largest. In the case of w=0, a GEO satellite with a large delay time is not selected and a decrease in throughput is the largest. On the other hand, w=0.5 is an optimum value because both a throughput improvement and inhibition of the E2E delay time can be achieved in a rain area less than 15000 km$^2$. In the rain area of 15000 km$^2$ or more (six or more feeder links are disconnected), w is set according to the operation policy. For example, when the throughput improvement is prioritized over the delay time, it is considered that control for setting large w is effective.

REFERENCE SIGNS LIST

30 GEO satellite
32 (32-1 to 32-4) Flight vehicle
34 Ground base station
36 Mobile network
38 Routing control device
40 (40-1 to 40-4) Terminal
42 Internet network
44 (44-1 to 44-6) Cover area

The invention claimed is:

1. A communication system in which communication stations are linked to each other to form a network and transmit packets through links, the communication system comprises one or more processor circuitry configured to perform:

monitoring a traffic amount of the link between the communication stations;

calculating a cost used for routing in the communication stations; and executing routing based on the cost, wherein the cost calculation includes:

at least two calculations among calculation of a congestion level of each link based on a traffic amount of a link between the communication stations, calculation of a delay time of each link based on at least one of a distance of the link between the communication stations and a transmit processing delay, and calculation of reliability of the link, applying a weight to each of elements obtained in the at least two calculations; and calculating the cost by combining results obtained by multiplying the elements by the weights.

2. The communication system according to claim 1, wherein said one or more processor is configured to perform:

monitoring a connection status of the network; and setting the weight based on the connection status of the network.

3. The communication system according to claim 2, wherein the connection status of the network includes a disconnection ratio of the link, and the weight is set based on the disconnection ratio.

4. The communication system according to claim 3, wherein said one or more processor is configured to perform:

detecting an operation policy applied to the network; and setting the weight based on the operation policy.

5. The communication system according to claim 4, comprising:

a memory configured to store events that may occur in the network for each of a plurality of operation policies to be applied to the network, wherein the detection of the operation policy includes detecting, when one event stored in the memory occurs, an operation policy corresponding to the event as an operation policy applied to the network.

6. The communication system according to claim 5, wherein said one or more processor is configured to perform:

monitoring at least one of a total traffic amount distributed in the network and a total packet stagnation amount of packets stagnating in the communication station; and calculating the weight based on at least one of the total traffic amount and the total packet stagnation amount.

7. The communication system according to claim 6, wherein said one or more processor is configured to perform:

identifying at least one of QoS and an application type of traffic flowing in the network; and calculating the weight based on at least one of the QoS and the application type, and wherein the routing is executed for each traffic.

8. The communication system according to claim 4, wherein said one or more processor is configured to perform:

monitoring at least one of a total traffic amount distributed in the network and a total packet stagnation amount of packets stagnating in the communication station; and calculating the weight based on at least one of the total traffic amount and the total packet stagnation amount.

9. The communication system according to claim 3, wherein said one or more processor is configured to perform:

monitoring at least one of a total traffic amount distributed in the network and a total packet stagnation amount of packets stagnating in the communication station; and calculating the weight based on at least one of the total traffic amount and the total packet stagnation amount.

10. The communication system according to claim 2, wherein said one or more processor is configured to perform:

detecting an operation policy applied to the network; and setting the weight based on the operation policy.

11. The communication system according to claim 10, comprising:

a memory configured to store events that may occur in the network for each of a plurality of operation policies to be applied to the network, wherein the detection of the operation policy includes detecting, when one event stored in the memory occurs, an operation policy corresponding to the event as an operation policy applied to the network.

12. The communication system according to claim 10, wherein said one or more processor is configured to perform:

monitoring at least one of a total traffic amount distributed in the network and a total packet stagnation amount of packets stagnating in the communication station; and calculating the weight based on at least one of the total traffic amount and the total packet stagnation amount.

13. The communication system according to claim 2, wherein said one or more processor is configured to perform:

monitoring at least one of a total traffic amount distributed in the network and a total packet stagnation amount of packets stagnating in the communication station; and calculating the weight based on at least one of the total traffic amount and the total packet stagnation amount.

14. The communication system according to claim 1, wherein said one or more processor is configured to perform:

detecting an operation policy applied to the network; and setting the weight based on the operation policy.

15. The communication system according to claim 14, comprising:

a memory configured to store events that may occur in the network for each of a plurality of operation policies to be applied to the network, wherein the detection of the operation policy includes detecting, when one event stored in the memory occurs, an operation policy corresponding to the event as an operation policy applied to the network.

16. The communication system according to claim 15, wherein said one or more processor is configured to perform:

monitoring at least one of a total traffic amount distributed in the network and a total packet stagnation amount of packets stagnating in the communication station; and calculating the weight based on at least one of the total traffic amount and the total packet stagnation amount.

17. The communication system according to claim 14, wherein said one or more processor is configured to perform:

monitoring at least one of a total traffic amount distributed in the network and a total packet stagnation amount of packets stagnating in the communication station; and calculating the weight based on at least one of the total traffic amount and the total packet stagnation amount.

18. The communication system according to claim 1, wherein said one or more processor is configured to perform:

monitoring at least one of a total traffic amount distributed in the network and a total packet stagnation amount of packets stagnating in the communication station; and calculating the weight based on at least one of the total traffic amount and the total packet stagnation amount.

19. The communication system according to claim 1, wherein said one or more processor is configured to perform:

identifying at least one of QoS and an application type of traffic flowing in the network; and calculating the weight based on at least one of the QoS and the application type, wherein the routing is executed for each traffic.

20. A communication method in which communication stations are linked to each other to form a network and transmit packets through links, the communication method comprising:

monitoring a traffic amount of the link between the communication stations;

calculating a cost used for routing in the communication stations; and executing routing based on the cost, wherein the cost calculation includes:

at least two calculations among calculation of a congestion level of each link based on a traffic amount of a link between the communication stations, calculation of a delay time of each link based on at least one of a distance of the link between the communication stations and a transmit processing delay, and calculation of reliability of the link;

applying a weight to each of elements obtained in the at least two processes; and calculating the cost by combining results obtained by multiplying the elements by the weights.

* * * * *